(12) United States Patent
D'Andreta et al.

(10) Patent No.: US 7,736,097 B2
(45) Date of Patent: Jun. 15, 2010

(54) ENVIRONMENTAL BARRIER DEVICE

(75) Inventors: Mark D'Andreta, Ortonville, MI (US); Stephen Mini, Richmond, MI (US)

(73) Assignee: M&D Environmental Barriers, LLP, Sterling Heights, MI (US)

( * ) Notice: Subject to any disclaimer, the term of this patent is extended or adjusted under 35 U.S.C. 154(b) by 99 days.

(21) Appl. No.: 11/556,401

(22) Filed: Nov. 3, 2006

(65) Prior Publication Data

US 2007/0042197 A1 Feb. 22, 2007

Related U.S. Application Data

(60) Provisional application No. 60/792,382, filed on Apr. 14, 2006.

(51) Int. Cl.
*E02D 17/20* (2006.01)
(52) U.S. Cl. .............. 405/302.6; 405/302.7; 405/302.4; 405/15; 256/12.5
(58) Field of Classification Search .............. 405/302.4, 405/302.6, 302.7, 15, 21; 256/12.5, 13.1; 404/10, 11; 40/608, 607.05, 602
See application file for complete search history.

(56) References Cited

U.S. PATENT DOCUMENTS

| | | | | |
|---|---|---|---|---|
| 1,668,288 A * | 5/1928 | Schrank | ........................ | 404/10 |
| 4,031,676 A | 6/1977 | Dally | .......................... | 52/102 |
| 4,162,863 A | 7/1979 | Gaudard et al. | ............... | 405/45 |
| 4,279,535 A * | 7/1981 | Gagliardi et al. | .............. | 405/15 |
| 4,605,204 A * | 8/1986 | Schmanski et al. | ............. | 256/19 |
| 4,756,511 A | 7/1988 | Wright, III | .................. | 256/12.5 |
| 5,051,028 A | 9/1991 | Houck et al. | ................... | 405/45 |
| 5,128,189 A | 7/1992 | Bartlett | ......................... | 428/71 |
| 5,236,281 A | 8/1993 | Middleton | .................. | 405/114 |
| 5,464,492 A | 11/1995 | Gregory et al. | ............. | 156/246 |
| 5,536,111 A | 7/1996 | Doernemann | ................ | 405/16 |
| 5,605,416 A * | 2/1997 | Roach | .......................... | 405/21 |
| 5,615,499 A | 4/1997 | McGuire et al. | .............. | 37/367 |
| 5,636,939 A | 6/1997 | Brown | | |
| 5,743,674 A | 4/1998 | Healy | .......................... | 405/52 |

(Continued)

OTHER PUBLICATIONS

International Search Report and Written Opinion of the International Searching Authority for International Application No. PCT/US07/12329, mailing date Feb. 26, 2008; 6 Pages.

*Primary Examiner*—David J Bagnell
*Assistant Examiner*—Sean D Andrish
(74) *Attorney, Agent, or Firm*—Harness, Dickey & Pierce, P.L.C.

(57) ABSTRACT

An environmental barrier device includes a first member and a second member. The first member may be constructed of a first sheet material. The first member may have a memory retaining shape. The first member may be normally oriented in a generally upright position and resiliently deflectable from the generally upright position. The second member may be secured to the first member. The second member may be constructed of a second sheet material. The second sheet material may be flexible and may define a filter media. The filter media may allow the passage of water and preclude the passage of dirt and silt. The environmental barrier device includes a lower portion for positioning below ground level and an upper portion for positioning above ground level. The environmental barrier device may be driven over or otherwise deflected from a generally upright orientation and the first member may automatically return the environmental barrier device to the generally upright orientation.

2 Claims, 4 Drawing Sheets

U.S. PATENT DOCUMENTS

| | | | |
|---|---|---|---|
| 5,800,091 A | 9/1998 | Van Romer | 405/52 |
| 5,820,297 A | 10/1998 | Middleton | 405/52 |
| 5,915,878 A | 6/1999 | Carpenter | 405/38 |
| 5,943,798 A | 8/1999 | McGuire et al. | 37/367 |
| 5,944,443 A * | 8/1999 | Benedict | 405/21 |
| 6,053,665 A | 4/2000 | Richardson | 405/258 |
| 6,155,546 A | 12/2000 | Whitener | 269/3 |
| 6,158,923 A | 12/2000 | Wheeler et al. | 405/116 |
| 6,334,736 B1 | 1/2002 | Johnson et al. | 405/114 |
| 6,398,459 B1 | 6/2002 | Vreeland | 405/302.6 |
| 6,455,546 B2 | 9/2002 | Cross | 514/322 |
| 6,464,428 B1 | 10/2002 | Mikell | 405/15 |
| 6,517,294 B2 | 2/2003 | Vreeland | 405/302.7 |
| 6,540,445 B1 | 4/2003 | Evans, Jr. | 405/302.6 |
| 6,641,335 B1 | 11/2003 | Allard | 405/302.6 |
| 6,796,747 B1 | 9/2004 | Vreeland | 405/302.7 |
| 6,848,866 B1 | 2/2005 | McGinn | |
| 7,008,144 B2 | 3/2006 | McGinn | |
| 7,128,497 B2 | 10/2006 | Daluise | 405/43 |
| 7,131,787 B2 | 11/2006 | McGinn | |
| 7,172,372 B2 | 2/2007 | McGinn | |
| 2004/0217049 A1 * | 11/2004 | Bayer et al. | 210/500.36 |
| 2006/0171785 A1 | 8/2006 | McGinn et al. | |
| 2009/0148243 A1 | 6/2009 | McGinn et al. | |

* cited by examiner

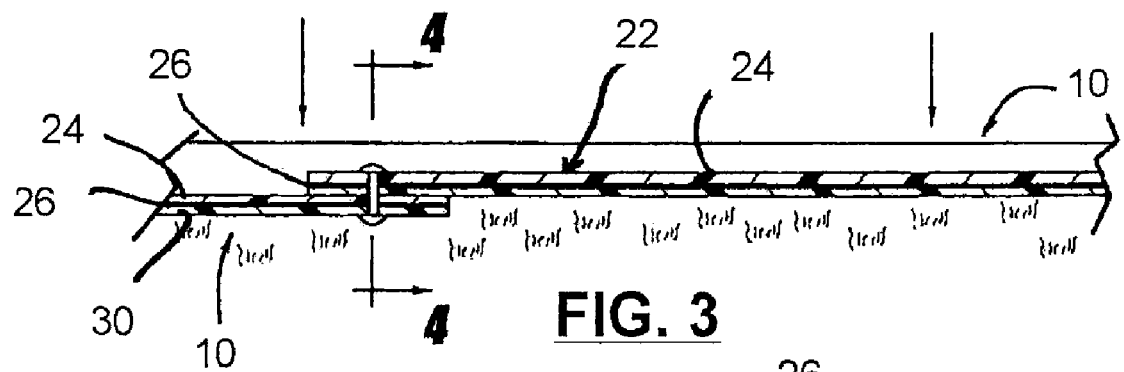
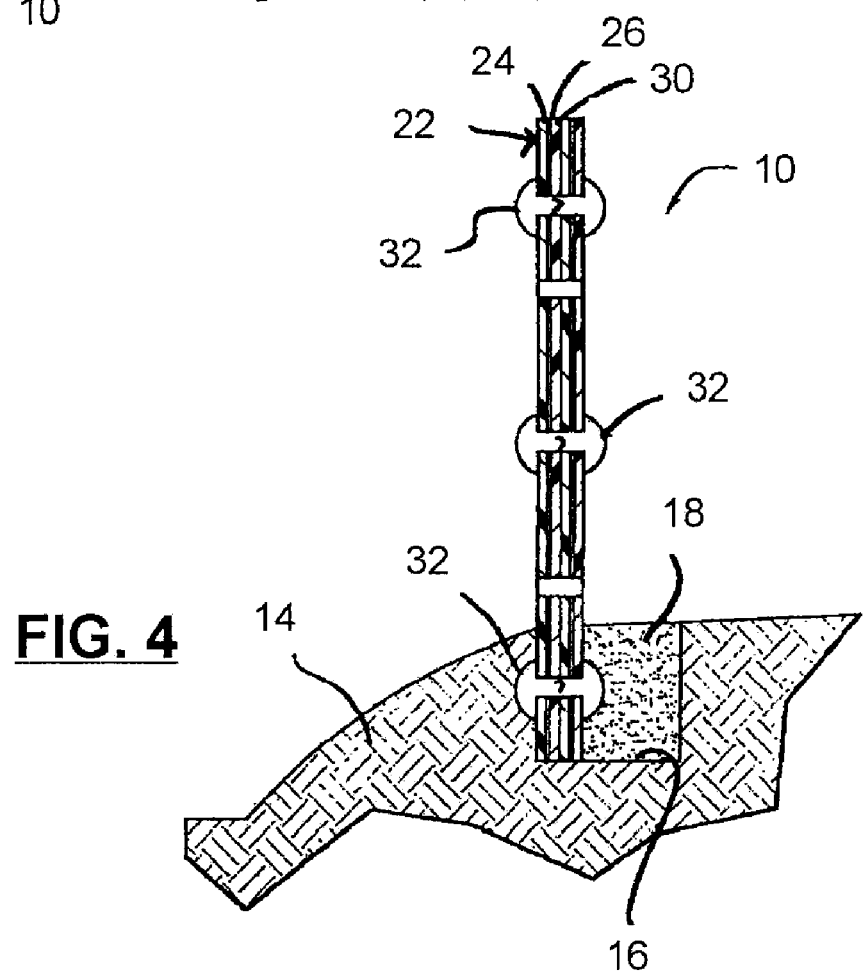

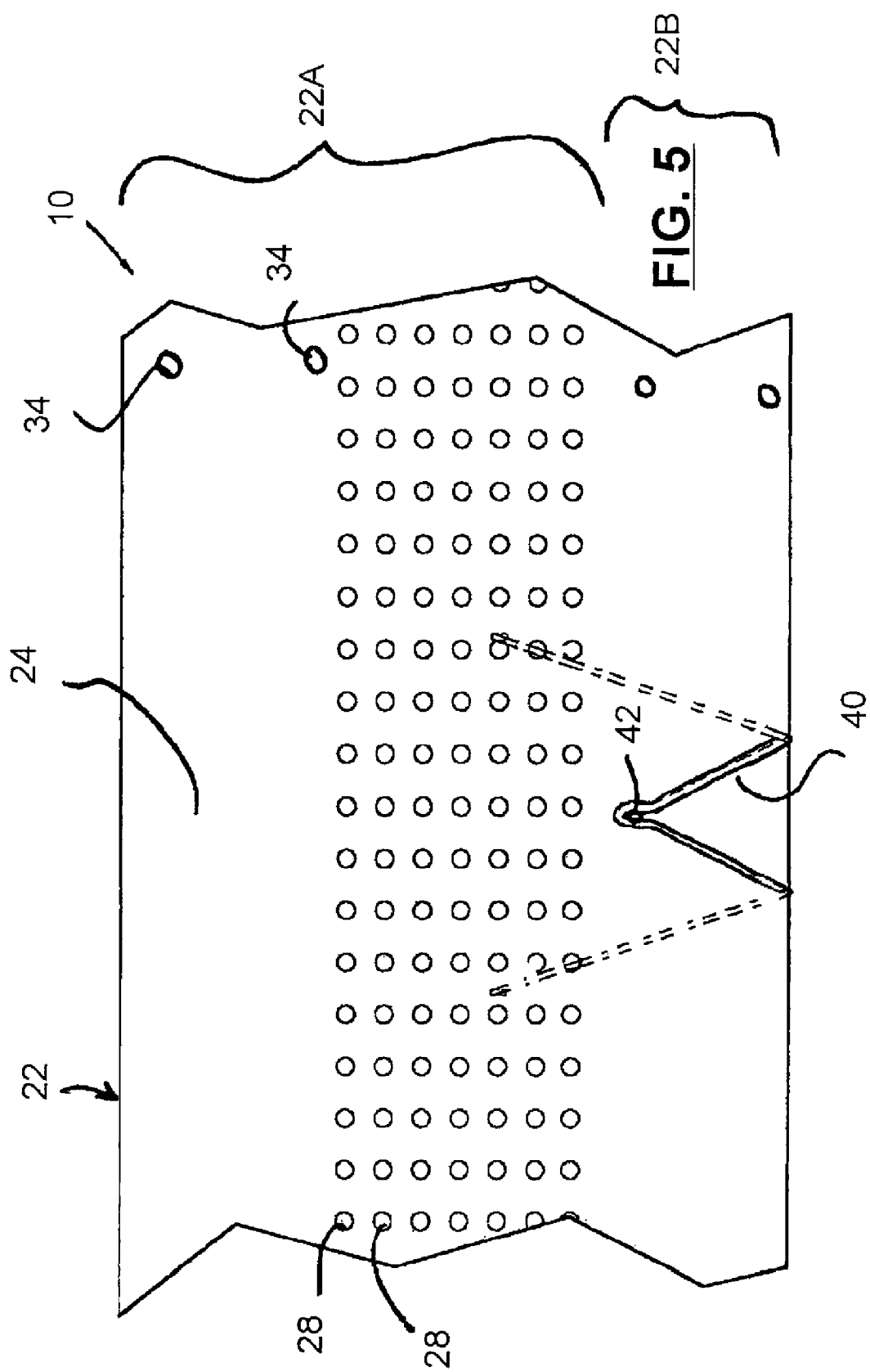

ENVIRONMENTAL BARRIER DEVICE

CROSS-REFERENCE TO RELATED APPLICATION

This application claims priority to U.S. Provisional Patent Application No. 60/792,382 filed 14 Apr. 2006, which application is herein expressly incorporated by reference.

INTRODUCTION

The present teachings generally relate to environmental barrier devices. More particularly, the present teachings relate to such devices for reducing soil erosion at construction sites, for example, and a method of reducing soil erosion at construction sites.

Exposed soil areas are subject to water erosion and sediment movement during and after storm water events. Materials and methods are required to eliminate soil loss or movement across construction sites from such events. A silt fence is a temporary barrier used to intercept sediment-laden runoff from small areas. Silt fences are effective in trapping sediment from all activities that involve soil disturbance. They can be used on adjacent properties, adjacent bodies of water, large sloping areas, near streams and waterways, near surface drainage ways and other areas to prevent water erosion and sediment movement.

A conventional silt fence includes a fabric portion and a plurality of stakes. The fabric portion extends between the stakes. The stakes serve to anchor and support the fabric portion. The fabric functions to prevent unwanted erosion and sediment movement while permitting the passage of rainwater.

While conventional silt fences have proven to be satisfactory for their intended use of preventing erosion and sediment movement, they are all associated with drawbacks and limitations. In this regard, construction vehicles may easily knock over a conventional silt fence and render it inoperative for its intended use. Accordingly, it remains a need in the pertinent art to provide an environmental barrier which prevents water erosion and sediment movement while overcoming the drawbacks and limitations associated with known structures, including but not limited to those discussed above.

SUMMARY

According to one aspect, the present teachings provide an environmental barrier device that includes a first member and a second member. The first member may be constructed of a first sheet material and may have a memory retaining shape. The first member may be normally oriented in a generally upright position and resiliently deflectable from the generally upright position. The second member may be secured to the first member and may be constructed of a second sheet material. The second sheet material may be flexible and may define a filter media. The filter media may allow the passage of water through the barrier device and preclude the passage of dirt and silt through the barrier device. A lower portion of the first member may be positioned below ground level and an upper portion positioned above ground level. The environmental barrier device may be driven over or otherwise deflected from a generally upright orientation and the first member may automatically return the environmental barrier device to the generally upright orientation.

According to another aspect, the present teachings provide an environmental barrier device for permitting the passage of rain water and preventing the passage of soil. The environmental barrier device includes a flexible member having a length and a height. The length is substantially greater than the height. The flexible member has at least a portion that is a free-standing portion. The free-standing portion is deflectable from a generally vertical orientation when subjected to a load. The free-standing portion is further memory retaining so as to return to the generally vertical orientation when the load is removed. The environmental barrier device additionally includes means for permitting the passage of rain water through the flexible member and means for preventing the passage of soil through the flexible member.

According to yet another aspect, the present teachings provide a method of reducing soil erosion at a construction site while providing substantially unrestricted access to the construction site with construction vehicles. The method includes providing a flexible member having a length and a height, the length being substantially greater than the height. The method additionally involves anchoring the flexible member to the ground such that a free-standing portion of the flexible member upwardly extends from the ground. The method further includes deflecting the free-standing portion of the flexible member from the generally vertical orientation and resiliently returning the free-standing portion of the flexible member to the generally vertical orientation.

Further areas of applicability of the present teachings will become apparent from the description and appended claims provided hereinafter. It should be understood that the detailed description and specific examples, while indicating the various examples of the present teachings, are intended for purposes of illustration only and are not intended to limit the scope of the teachings.

DRAWINGS

The present invention will become more fully understood from the detailed description and the accompanying drawings, wherein:

FIG. 3 is a top view of the environmental barrier device in accordance with the present teachings and as shown installed in FIG. 1, the environmental barrier device shown in cross section.

FIG. 4 is a cross-sectional view taken along the line 4-4 of FIG. 3.

FIG. 5 is an enlarged front view of an environmental barrier device in accordance with the present teachings, the environmental barrier device shown operatively associated with a mounting bracket suitable for temporarily securing the environmental barrier device to a curb, for example.

DESCRIPTION OF VARIOUS ASPECTS

The following description of the present teachings is merely exemplary in nature and is in no way intended to limit the invention, its application, or uses.

Figure 1:
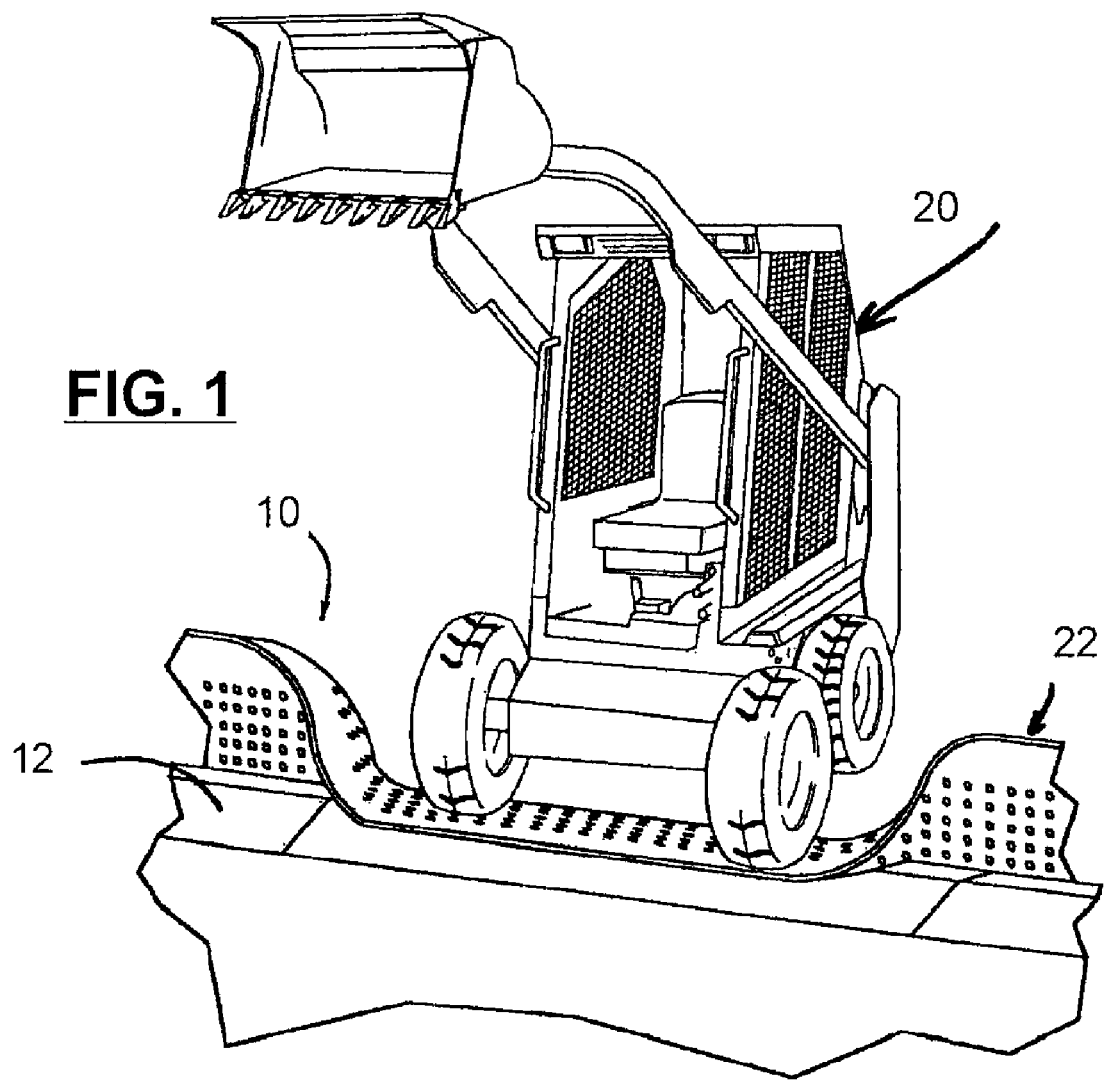
FIG. 1 is an environmental view illustrating an environmental barrier device in accordance with the present teachings, the environmental barrier device shown operatively installed at a construction site, a construction vehicle shown crossing the environmental barrier device and thereby applying a load to the environmental device to deflect it from a normally upright orientation.
Figure 2:
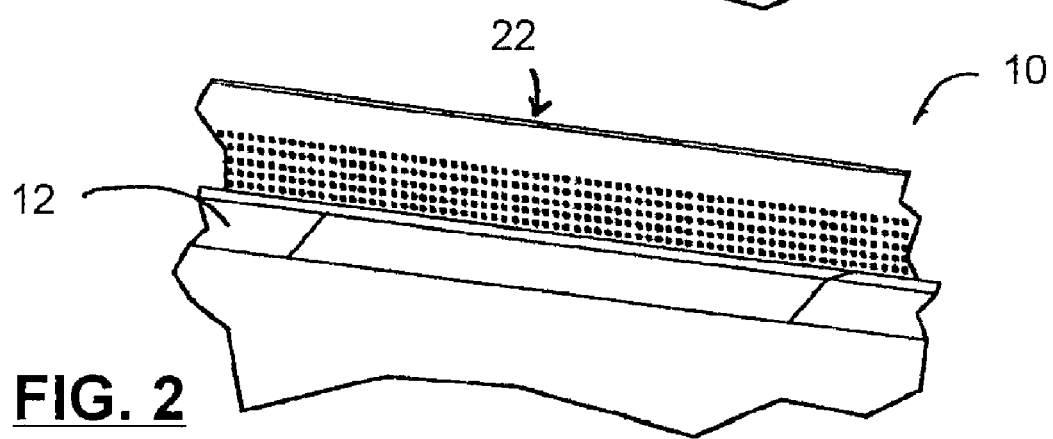
FIG. 2 is a view of a portion of FIG. 1 illustrating the environmental barrier device after the construction vehicle has passed, the environmental barrier device resiliently returning to a generally vertical orientation after the load of the vehicle has been removed.
Figure 6:
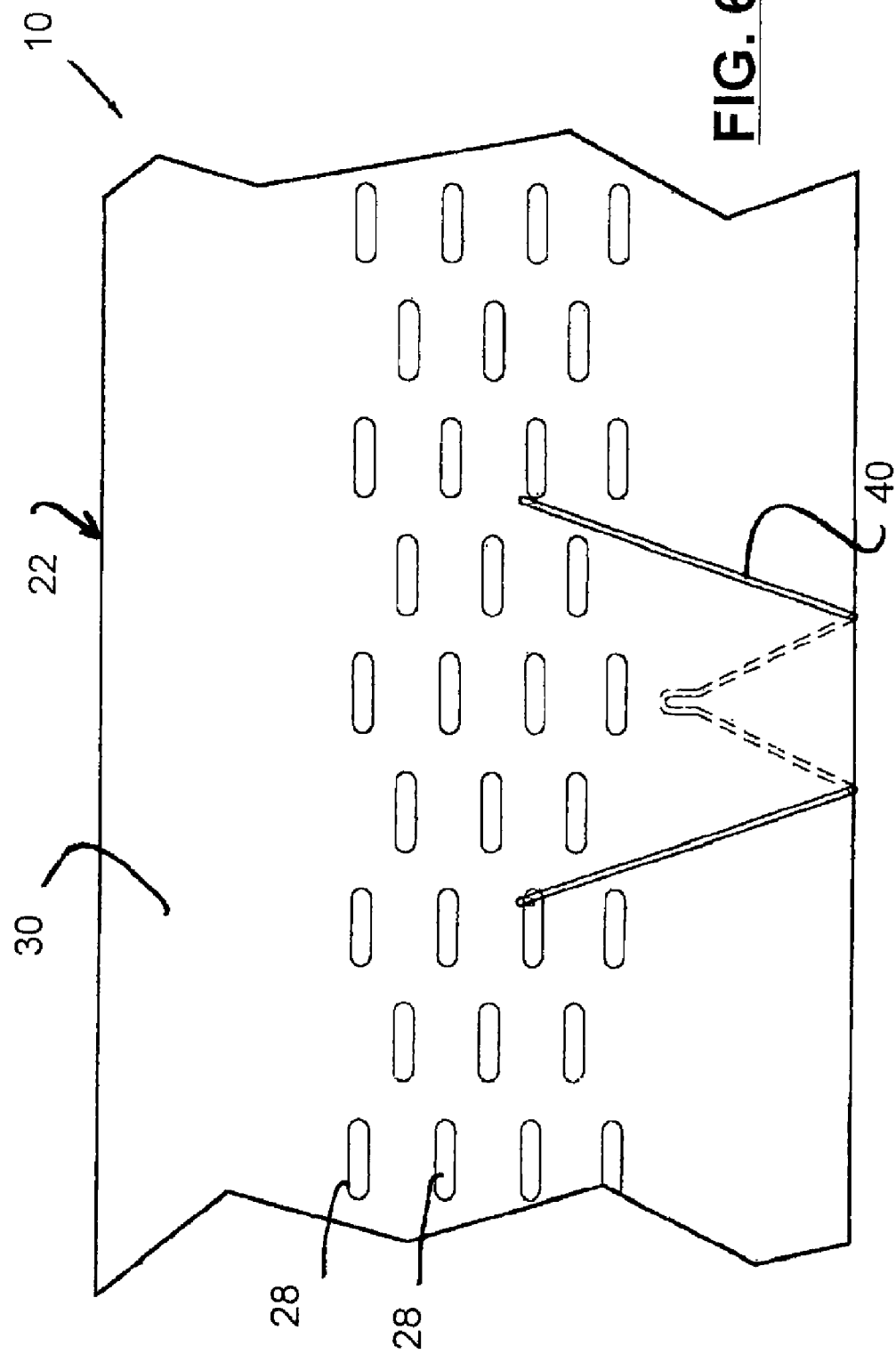
FIG. 6 is an enlarged rear view of an environmental barrier device in accordance with the present teachings, the environmental barrier device shown operatively associated with a mounting bracket suitable for temporarily securing the environmental barrier device to a curb, for example.

With general reference to the drawings, an environmental barrier device constructed in accordance with the teachings of the present invention is illustrated and generally identified at reference character 10. The environmental barrier device may be used at a construction site, for example. In this regard, the environmental barrier device 10 may be used to reduce soil erosion. In one application, the environmental barrier device 10 may be positioned proximate a curb 12 (as shown in FIGS. 1 and 2) or other construction site boundary. Alternatively, the environmental barrier device 10 may be positioned in a trench 14 formed in undisturbed soil 16. The trench 14 may be back-filled with disturbed soil 18.

The environmental barrier device 10 may be oriented in a generally vertical plane and define a barrier for reducing soil erosion. The environmental barrier device 10 may function to prevent the passage of silt from a construction site side to a street side, for example. Additionally, the environmental barrier device 10 may provide for the passage of water (e.g., rain water) from the construction site side to the street side.

The environmental barrier device 10 may be anchored in the ground and otherwise be a self-standing structure. In this regard, it may not be necessary to support the environmental barrier device 10 with stakes or similar structure conventionally used to support a silt fence. In certain applications, the environmental barrier device 10 may be anchored approximately eight inches below ground level.

The environmental barrier device 10 may be a resilient structure that is deflectable under load and which resiliently returns to a generally vertical orientation after the load is removed. The environmental view of FIG. 1 illustrates a portion of the environmental barrier device 10 deflected from the generally vertical orientation by the passage of a construction vehicle 20. In FIG. 2, the construction vehicle 20 has passed and the deflected portion of the environmental barrier device 10 automatically and resiliently returns to its generally vertical orientation.

The environmental barrier device 10 includes a flexible member 22 having a length and a height. As will be addressed below, the length may be substantially greater than the height. The environmental barrier device 10 may additionally include means for permitting the passage of rain water through the flexible member 22. The environmental barrier device 10 may further include means for preventing the passage of soil through the flexible member 22.

The flexible member 22 may include an upper portion 22A and a lower portion 22B. As will be discussed further below, the lower portion 22B is intended to be buried or otherwise anchored with respect to the ground. The upper portion 22A is intended to upwardly extend from the ground. In certain applications, the lower portion 22B need not have the same flexibility nor resiliency of the upper portion 22A.

The flexible member 22 of the environmental barrier device 10 may be a composite structure having a plurality of components or layers. The flexible member 22 may generally include a first member or first layer 24 and a second member or second layer 26. The first member 24 may be constructed of a sheet material. The first member 24 may have a memory retaining shape and may provide the flexible member 22 with inherent resiliency to return to the generally vertical orientation or upright position.

The first member 24 may be constructed from a polyolefin foam sheet. One suitable material is commercially available under the registered trademark Volara® from Sekisui America Corporation. Other materials having suitable resiliency, strength and/or durability characteristics may be alternatively utilized.

The means for permitting the passage of rain water may include a plurality of holes or apertures 28 formed in the first member 24. The holes 28 may be round, oval, any other suitable shape or combinations of shapes to permit the passage of rain water through the first member 24. It will be appreciated that the location of the holes 28, the hole pattern, the size of the holes 28 and the number of holes 28 may be varied from application to application within the scope of the present teachings. Alternative to holes 28, the means for permitting the passage of rain water may comprise a sheet material that allows for the passage of rain water but prevents the passage of soil.

The means for preventing the passage of soil through the flexible member 22 may include a second member or second layer 26. The second member 26 may be a filter member. The second member 26 may be positioned adjacent one of the sides of the first member 24 so as to cover the openings 28. The second member 26 may be constructed of a second sheet material. The second sheet material 26 may be flexible and may define a filter media. The filter media 26 may allow the passage of water and preclude the passage of dirt and silt. In one application, the second member 26 may be a nylon mesh. Alternatively, any other material suitable for filtering soil from rain water may be employed. In certain applications, the means for filtering may simply be the holes 28 which are sized and provided in such number to provide the necessary filtering. The second member 26 may be secured to the first member 24. In this regard, the second member 26 may be glued or laminated to the first member 24. Alternatively, the second member 26 may be stitched or otherwise suitable secured to the first member 24.

The flexible member 22 may additionally include a third member or third layer 30. As with the first member 24, the third member 30 may be constructed of a sheet material and may have a memory retaining shape. Again, while other materials may be employed, the third member 30 may be constructed of a polyolefin foam sheet. One suitable material is commercially available under the registered trademark Volara®. In a manner similar to the first member 24, the third member 30 may include a plurality of holes or apertures. The second member 26 may be disposed between the first member 24 and the third member 30. The third member 30 may be secured to the first member 24 and/or the second member 26 by adhesive, lamination, stretching or any other suitable manner.

The flexible member 22 of the environmental barrier device 10 may be made in various lengths and heights. In one application, the flexible member 22 may be formed to have a length from approximately 50 feet to approximately 200 feet. The environmental barrier device 10 may be formed to have a height from approximately 20 inches to approximately 36 inches. In certain applications, it may be desirable to cut preformed sections to desired lengths.

Separate lengths of the flexible member 22 may be joined with mechanical fasteners 32. The flexible member 22 may be preformed with holes 34 (see FIG. 5, for example) for receiving the mechanical fasteners 32. The fasteners 32 may be used for splicing or repairs. One suitable mechanical fastener 32 is a two-piece fastener commercially available from Micro Plastics, Inc. of Flippin, Ark., as Part No. 27QB701000B. Other manners of coupling distinct lengths of the flexible member 22, including non-mechanical manners of fastening, may be employed within the scope of the present teachings.

In use, the lower portion 22B of the flexible member 22 may be buried or otherwise anchored relative to the ground. For example, approximately eight inches of the flexible member 22 may be set below grade for anchoring. Backfilling may be provided to support the flexible member 22.

In certain applications, it may be desirable to use the flexible member 22 with a bracket 40. The bracket 40 may be generally W-shaped and may engage the lower portion 22B of the flexible member 22. The bracket 40 may engage a fastener 42 (see FIG. 5). In this regard, fasteners 42 may be mounted in a curb 12 and the bracket 40 may be used for temporarily securing the flexile member 22 relative to the curb 12 prior to the backfilling soil adjacent the curb 12.

It will now be appreciated that an environmental barrier device 10 is provided that facilitates the entry and egress of construction vehicles about a construction site. A device 10 is shown and described that may be provided in a roll to facilitate shipping and handling. Upon completion of construction at a construction site, the environmental barrier device 10 may be removed for subsequent re-use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of reducing erosion comprising:
   providing a flexible member with a first sheet layer formed from a self-supporting material that allows the flexible member to automatically return to a substantially upright position from a deflected position after a predetermined load is removed from the flexible member;
   providing the flexible member with a second sheet layer substantially parallel to the first sheet layer;
   positioning the flexible member relative to ground such that the first sheet layer and the second sheet layer are substantially perpendicular to the ground; and
   continuously burying the resiliently flexible member along the entire length of a base of the flexible member relative to the ground such that the flexible member extends generally upward from the ground;
   wherein providing the second sheet layer includes providing a filter layer that permits fluid to pass through the flexible member and restricts the passage of solid particulate through the flexible member.

2. A method of reducing soil erosion comprising:
   providing a flexible member including a first sheet member that automatically returns to a substantially upright position from a deflected position after a predetermined load is removed from the flexible member;
   providing the flexible member with a second sheet member;
   providing the flexible member with a filter media disposed between the first sheet member and the second sheet member;
   positioning the flexible member relative to ground such that the first sheet member, the second sheet member, and the filter media are substantially perpendicular to the ground;
   forming at least one of the first sheet member and the second sheet member from a self-supporting material; and
   anchoring a base of the flexible member along a length of the base during installation of the flexible member.

* * * * *